United States Patent Office 3,438,847
Patented Apr. 15, 1969

3,438,847
PROCESS OF TREATING COMPOSITE BOARDS WITH BORATE CHEMICALS PRODUCED THEREBY AND PRODUCT
Harry A. Chase, Longview, Wash., assignor to Weyerhaeuser Company, Tacoma, Wash., a corporation of Washington
No Drawing. Filed Feb. 26, 1965, Ser. No. 435,695
Int. Cl. B32b 21/04, 7/02
U.S. Cl. 161—166       20 Claims

ABSTRACT OF THE DISCLOSURE

A composite board of comminuted wood and a binder with chemical components to make the board fire retardant and a method for producing the same wherein a borate chemical is diffused into the comminuted wood furnish prior to bonding the same.

---

This invention relates to a process for treating composite boards formed of comminuted wood and a suitable binder with chemical components to make the board fire retardant. More specifically, this invention relates to a process for treating composite boards with borate chemicals in a particular manner so as to minimize interference with particle bonding.

Boric acid has been known as a fire-retardant chemical for use on wood for many years. In the composite board manufacturing process, considerable tolerance for boric acid mixed with the adhesive used exists. Requirements of product properties and costs are fulfilled, but any high order of fire retardancy is not achieved. Boric acid alone is not a highly efficient fire retardant. However, borate salts of sodium or other strong bases in various forms and at several ratios with boric acid create very effective fire-retardant combinations, presumably through the Lewis acid/base phenomenon as is known in the art.

The boric acid and borate salts have been applied to the composite boards in a number of different ways. One method that has been practiced is to impregnate the outer surface of the composite board with a requisite combination of boric acid and borate salts by a pressure medium similar as is done in the impregnation of lumber and plywood. This method of impregnation has not been effective to achieve a fire-retardant composite board since often only the outer surfaces thereof are impregnated with the fire-retardant chemical and the board does not measure up to fire-retardant properties. In addition, redrying of the finished board is required, causing a loss in appearance and reduction in physical properties. Another method of adding the boric acid and borate salt combination to the composite board has been to mix the requisite combination of boric acid and borate salts with the adhesive and other materials that bind the wood particles together, and then press the same into its final form. However, the composite board binding adhesives are intolerant to borate salt which limits the amount that can be used. By using only a small amount of the borate salts, some fire retardancy of the board can be achieved. The amount of chemicals that can be tolerated by the adhesive falls short of that required for gaining the ultimate fire retardancy that can be obtained with the optimum combination system. Accordingly, if an increased amount of borate salt is added to the adhesive to be applied to the wood particles, the finished compressed panel composite board falls far short of the requisite properties as to physical strength and bonding characteristics of the adhesive since the presence of the borate salts interferes with the bonding properties of the particular adhesives used.

The object of this invention is to provide a process for forming composite boards using a combination of an acid material and borate salts during the manufacture of the boards which does not interfere with the bonding properties of the adhesive used.

Another object of this invention is to provide a process for forming composite boards having effective fire-retardant properties and physical properties equivalent to an untreated board.

Another object of this invention is to provide a process for manufacturing composite boards using borate salts in combination with an acid material without interfering with the bonding properties of the adhesive used to bind the particles in the final product.

In accordance with the preferred practice of the present invention, comminuted wood is formed by conventional means such as a hammer mill or flaker. A borate salt is then added to the comminuted wood furnish selected from a group consisting of sodium borate, potassium borate, ammonium borate, magnesium borate, preferably sodium borate. The amount of borate salt that may be added to the comminuted wood furnish may range from 3 to 25 parts by weight. The borate salt is added in solution form wherein the borate salt is dissolved in warm water ranging in temperature of 50° to 200° F. and thoroughly mixed within the wood furnish.

After the borate salt is added to the wood furnish, the borate salt is allowed to diffuse into the particles of the wood furnish. This diffusion is normally very rapid, being essentially complete in several seconds. In this manner, the sodium borate salt is buried within the wood furnish by diffusing into the wood cellular structure and becomes dissolved in the moisture within the wood itself. After the borate salt is completely diffused within the wood furnish, the wood furnish is then dried to from about 2 to 9% moisture content.

The thus treated wood furnish is next treated with an acidic material selected from the group consisting of boric acid, ammonium phosphate, ammonium sulfate, zinc chloride, or mixtures thereof, and a suitable binder in a conventional manner. It should be noted that while any one of the acid materials are suitable for use with the present invention, boric acid is preferred. The amount of boric acid used to be mixed with the binder may range from 3 to 15 parts by weight. The particular binders usable with the present invention are the aminoplasts such as urea formaldehyde or melamine formaldehyde. The amount of binder used may range from 3 to 15 parts by weight. As is conventional, other materials such as wax or other compositions conventionally used to be added to the binder system may be added at this stage.

The wood furnish is now precessed through a conventional mat forming apparatus and laid down in mat form and conveyed to heated platens to be pressed and cured at the desired pressure and temperature.

It should be noted that the above method may be altered by omitting the boric acid if desired, and employing from 15 to 20% borate salt and a board with excellent properties is achieved. However, longer press times are required. Further, the boric acid may be diffused into the wood furnish along with the borate salts, or the boric acid may be added separately in powdered form before, during or after resin addition.

It has been found that the above procedure in forming the composite board structure provides a unique panel which is highly effective in fire-retardant properties and also has excellent physical properties since the bonding properties of the adhesives used are not adversely affected by the borate salts.

The above method may be altered by providing a core material of comminuted wood with comminuted wood surfacing layers. The core material is provided with a smaller amount of the fire-retardant borate compounds. This is achieved by separating the comminuted wood furnish into a first and second furnish material. To the first material is added from 3 to 25% by weight borate salts which are then allowed to diffuse into the wood furnish and dried in the manner as noted above. Thereafter, the boric acid and binder materials are added thereto in the previously described manner. To the second furnish is added a lesser amount of fire-retardant materials or from 3 to 12% by weight. The addition of the borate chemicals to the second furnish may be done in similar fashion to the first furnish except for the lesser amount of fire-retardant materials used. As an alternative procedure with the second furnish, the borate salts may be included with the boric acid and resin binder materials up to the limit of the resin to tolerate the borate salt.

However, the first material is then divided into another two surfacing groups with one group being laid down onto a traveling belt structure and formed into a mat with the core material being placed on top thereof in a formed mat structure, and the second surfacing material is laid on top of the core material. Thereafter, this structure is then pressed and cured in the usual manner. In this manner, the outer surfaces of the panel structure are provided with a higher content of the borate salt than the core material which provides for a unique manner in cost saving for the chemical material added. This procedure, however, does not have a detrimental effect upon the high fire-retardant properties of the board nor the excellent physical properties of the board itself.

This procedure does not produce a core material with the requisite fire-retardant properties. However, when the surface layers are placed onto the core, the finished product exhibits excellent fire-retardant characteristics.

EXAMPLE I

A fire-retardant panel was formed by mixing 100 parts of comminuted wood at a moisture content of 35% and 10 parts by weight of disodium octaborate in a 20% water solution. The comminuted wood was allowed to diffuse for one hour and then dried to 6% moisture content. A mixture of 10 parts granulated boric acid, 10 parts, solid basis, of 65% urea resin and ½ part, solid basis, 40% wax emulsion, and 2 parts water was sprayed on the wood particles in a blender and then followed by forming and hot pressing to a density of 47.5 lbs./cu. ft. The above board was tested and found to have excellent flame spread rating and high physical strength properties.

EXAMPLE II

A fire-retardant panel was formed by mixing 100 parts of comminuted wood at a moisture content of 35% and 11 parts by weight of disodium octaborate in a 20% water solution. The comminuted wood was allowed to diffuse for one hour and then dried to 6% moisture content. A mixture of 7 parts granulated boric acid, 7 parts, solid basis, of 65% urea resin and ½ part, solid basis, 40% wax emulsion, and 2 parts water was sprayed on the wood particles in a blender and then followed by forming and hot pressing to a density of 47.5 lbs./cu. ft. The above board was tested and found to have excellent flame spread rating and high physical strength properties.

EXAMPLE III

A fire-retardant panel was formed by mixing 100 parts of comminuted wood at a moisture content of 35% and 13 parts by weight of disodium octaborate in a 20% water solution. The comminuted wood was allowed to diffuse for one hour and then dried to 6% moisture content. A mixture of 7 parts granulated boric acid, 10 parts, solid basis, of 65% urea resin and ½ part solid basis, 40% wax emulsion, and 2 parts water was sprayed on the wood particles in a blender and then followed by forming and hot pressing to a density of 47.5 lbs./cu. ft. The above board was tested and found to have excellent flame spread rating and high physical strength properties.

EXAMPLE IV

A fire-retardant panel was formed by mixing 100 parts of comminuted wood at a moisture content of 35% and 7 parts by weight of disodium octaborate in a 20% water solution. The comminuted wood was allowed to diffuse for one hour and then dried to 6% moisture content. A mixture of 13 parts granulated boric acid, 10 parts, solid basis, of 65% urea resin and ½ part, solid basis, 40% wax emulsion, and 2 parts water was sprayed on the wood particles in a blender and then followed by forming and hot pressing to a density of 47.5 lbs./cu. ft. The above board was tested and found to have acceptable flame spread rating and high physical strength properties.

EXAMPLE V

A three-layer board was prepared as follows: 100 parts of dry basis green comminuted wood was formed having 40% moisture content. Ten parts disodium octaborate in 20% water solution was sprayed onto the comminuted wood furnish and immediately dried. Next, 10 parts, dry wood basis, of 65% solids urea resin was mixed with 10 parts powdered boric acid and ½-part wax emulsion with 7 parts of water. This solution was spray mixed with the treated comminuted wood. The above furnish was then divided into two equal parts. An additional furnish was formed for the core portion of the three-layer board. This consisted of 100 parts of dry wood particles having mixed therewith 7 parts of urea resin mixed with 6.3 parts of boric acid and .7 part sodium octaborate with ½-part wax emulsion and 1 part water for dilution. The above mixture was sprayed on the dried particles. Using about 1 part surface to 2 parts core, the above prepared furnishes were formed into a panel with the surfaces sandwiching the core material therebetween. The panels were hot pressed to a density of about 45 lbs./cu. ft. The strength and moisture properties were excellent as were the fire-retardant properties.

EXAMPLE VI

A water solution of disodium octaborate was sprayed on the green particles, using 20% $Na_2B_8O_{13}$. This was allowed to diffuse one hour after which the particles were dried. To the dried particles was added 10% resin (as 65% solution) and ½% wax as a wax emulsion. The physical properties of the board were good, although a longer than normal press time was required.

EXAMPLE VII

The disodium octaborate in the Example VI was replaced with a 50:50 mixture of disodium octaborate and boric acid. A good board was obtained, in this case with normal press time.

EXAMPLE VIII

The green particles were sprayed with a water solution of disodium octaborate which added 10% $Na_2B_8O_{13}$ to the wood. This was allowed to diffuse one hour after which the particles were dried. In the blender, 10% powdered boric acid was added followed by 10% resin as a 65% solution and ½% of wax as a wax emulsion. Good quality boards were obtained at normal press times.

EXAMPLE IX

A water solution of disodium octaborate was sprayed on the wood particles and then dried. The amount of disodium octaborate added was 10% based on the bone-dry weight of the wood content. Next a fine granular form of an acid ammonium phosphate (mono ammonium phosphate) was mixed with the treated particles. The amount of ammonium phosphate added was 10% based on the weight of the dry wood present. A liquid urea formaldehyde resin equivalent to 10% resin solids and a wax emulsion equivalent to ½% wax, both percentages based on the weight of the dry wood content, was sprayed on the wood particles. The wood particles were formed into a mat and pressed by standard methods. The board showed good strength and high fire-retardant characteristics.

EXAMPLE X

The acid ammonium phosphate in Example IX was replaced with ammonium sulfate and a board was formed in the same manner. Tests on the board indicated that it had high strength characteristics and excellent fire-retardant properties.

EXAMPLE XI

A water solution of disodium octaborate was sprayed on green wood particles to a level of 25% based on the bone-dry wood content present. The wood particles were then dried. The wood particles were then sprayed with a mixture of boric acid containing 15% by weight based on the bone-dry content of the wood and a urea formaldehyde resin containing 10% by weight based on the weight of the bone-dry wood content. The wood particles were formed into a mat and pressed by standard methods. The board thus formed showed high strength characteristics and excellent fire-retardant properties.

Boards formed in accordance with this invention were comparatively tested with fire-retardant boards known in the prior art. All the boards were tested according to ASTM E-162 standards to indicate the flame spread index. The results of these tests are shown in the following table.

TABLE

| Sample | Chemicals added | Average flame spread index | Type of board | Smoke deposited, (mg.) |
|---|---|---|---|---|
| 1 | Boric acid, 16% by wt. | 18.2 | Single-layer | |
| 2 | Boric acid, 25% in surface, 21% in core. | 10.5 | Three-layer | |
| 3 | Boric acid and sodium borate as in Example I. | 3.0 | Single-layer | |
| 4 | Boric acid and sodium borate as in Example V. | 4.4 | Three-layer | 0.1 |
| 5 | Mono ammonium phosphate, 18% in surface, 16% in core. | | do | 1.8 |

As can be seen, the boards formed in accordance with this invention possess far superior fire-retardant properties.

What is claimed is:

1. A process for manufacturing fire-retardant composite wood products, comprising: forming comminuted wood furnish; diffusing into said comminuted wood furnish a fire-retardant borate chemical selected from the group consisting of sodium borate, potassium borate, ammonium borate, magnesium borate, and mixtures thereof; drying said wood furnish; blending a mixture of acidic material selected from the group consisting of boric acid, ammonium phosphate, ammonium sulfate, zinc chloride, and mixtures thereof and a binder with the wood furnish; compressing the wood furnish at a sufficient pressure and temperature to cure the binder to form a composite wood product.

2. A process for manufacturing fire-retardant composite wood products in accordance with claim 1 wherein said fire-retardant borate chemical is sodium borate.

3. A process for manufacturing fire-retardant composite wood products comprising: forming comminuted wood furnish; diffusing into said comminuted wood furnish a fire-retardant in accordance with claim 1 wherein said borate chemical diffused into the wood may range from between 3 to 25% based on the amount of wood furnish.

4. A process for manufacturing fire-retardant composite wood products in accordance with claim 1 wherein the amount of boric acid blended with the binder may range from 3 to 15% based on the weight of the wood furnish.

5. A process for manufacturing fire-retardant composite wood products, comprising: forming comminuted wood furnish; dividing the comminuted wood furnish into two components; diffusing into the first component of said comminuted wood furnish a fire-retardant borate chemical selected from the group consisting of sodium borate, potassium borate, ammonium borate, magnesium borate, and mixtures thereof; diffusing into the second component of said comminuted wood furnish a fire-retardant borate chemical selected from the group consisting of sodium borate, potassium borate, ammonium borate, magnesium borate, and mixtures thereof in an amount less than the amount added to the first component of the wood furnish; blending a mixture of an acidic material selected from the group consisting of boric acid, ammonium phosphate, ammonium sulfate, and mixtures thereof and a binder with the first and second components of the wood furnish; forming a three-layer mat structure with the second component being formed as the core material of the three-layer panel; compressing the three-layer wood furnish at a sufficient pressure and temperature to cure the binder to form a three-layer composite wood product.

6. A process for manufacturing fire-retardant composite wood products in accordance with claim 5 wherein the amount of borate chemical added to the first component may range from between 3 to 25% based on the weight of the wood furnish and the amount of borate chemical added to the second component may range from between 3 to 12% based on the weight of the second component of the wood furnish.

7. A process for manufacturing fire-retardant composite wood products, comprising: forming comminuted wood furnish; diffusing into said comminuted wood furnish a fire-retardant borate chemical; drying said wood furnish; blending a binder with the wood furnish; compressing the wood furnish at a sufficient pressure and temperature to cure the binder to form a composite wood product.

8. A process for manufacturing fire-retardant composite wood products, comprising: forming comminuted wood furnish; diffusing into said comminuted wood furnish a mixture of an acidic material selected from the group consisting of boric acid, ammonium phosphate, ammonium sulfate and mixtures thereof and a fire-retardant borate chemical; blending a binder with the wood furnish; compressing the wood furnish at a sufficient pressure and temperature to cure the binder to form a composite wood product.

9. A process for manufacturing fire-retardant composite wood products, comprising: forming comminuted wood furnish; dividing the comminuted wood furnish into two components; diffusing a fire-retardant borate chemical into the first component of the wood furnish; blending a mixture of borate chemical, boric acid, and a binder with the second component of the wood furnish; blending a mixture of boric acid and a binder with the first component of the wood furnish; forming a three-layer mat structure with the second component being formed as the core material of the three-layer panel; compressing the three-layer panel at a sufficient pressure and temperature to cure the binder.

10. A process for manufacturing fire-retardant wood products in accordance with claim 9, wherein the borate chemical in said first component may range from 3 to 25% based on the amount of wood furnish and wherein the amount of borate chemicals in said second component may range from 3 to 12% by weight.

11. A composite wood product, comprising: comminuted wood bound together by a resin binder; said comminuted wood having a borate chemical diffused therein selected from the group consisting of sodium borate, potassium borate, ammonium borate, magnesium borate, and mixtures thereof.

12. A composite wood product in accordance with claim 11 wherein the borate chemical is sodium borate.

13. A composite wood product in accordance with claim 11 wherein the amount of borate chemical diffused into the wood product may range from 3 to 25% based on the weight of the wood furnish.

14. A composite wood product in accordance with claim 11 together with a fire-retardant acid material intermixed with the comminuted wood selected from the group consisting of boric acid, ammonium sulfate, ammonium phosphate, zinc chloride, and mixtures thereof.

15. A composite wood product, comprising: a three-layer structure composed of a core material of comminuted wood furnish and a pair of outer surface materials of comminuted wood furnish bonded to said core material; said core material being provided with a borate chemical, a fire-retardant acid material and a binder; said surface materials having a borate chemical diffused into the wood furnish and being provided with a fire-retardant acid material and binder; the amount of borate chemicals within the core material being less than the amount of borate chemicals in the surface material.

16. A composite wood product in accordance with claim 15 wherein the borate chemical may be selected from a group consisting of sodium borate, potassium borate, ammonium borate, magnesium borate and mixtures thereof.

17. A composite wood product in accordance with claim 16 wherein the borate chemical is sodium borate.

18. A composite wood product in accordance with claim 15 wherein the amount of borate chemical within the core material may range from 3 to 12% based on the amount of wood and the amount of borate chemicals in the surface material may range from 3 to 25% based on the amount of wood.

19. A composite wood product in accordance with claim 15 wherein the fire-retardant acid material is selected from the group consisting of boric acid, ammonium phosphate, ammonium sulfate, zinc chloride, and mixtures thereof.

20. A composite wood product in accordance with claim 18 wherein the fire-retardant acid material is boric acid.

References Cited

UNITED STATES PATENTS

| | | | |
|---|---|---|---|
| 2,680,102 | 6/1954 | Becher | 260—17.3 |
| 2,849,316 | 9/1956 | Lauring | 162—159 |
| 3,202,570 | 8/1965 | Videen | 252—8.1 X |
| 3,321,421 | 5/1967 | Pataki | 161—168 X |
| 1,216,729 | 2/1917 | Prince | 117—138 |

FOREIGN PATENTS 251,468   5/1964   Australia.

ROBERT F. BURNETT, *Primary Examiner.*

R. L. MAY, *Assistant Examiner.*

U.S. Cl. X.R.

106—15; 117—137; 161—270, 403; 162—159; 252—8.1